United States Patent
Hamaguchi et al.

(10) Patent No.: US 10,534,488 B2
(45) Date of Patent: Jan. 14, 2020

(54) CAPACITANCE DETECTION METHOD, POSITION DETECTION METHOD, TOUCH PANEL CONTROLLER, AND ELECTRONIC DEVICE

(71) Applicant: SHARP KABUSHIKI KAISHA, Sakai, Osaka (JP)

(72) Inventors: Mutsumi Hamaguchi, Sakai (JP); Masayuki Miyamoto, Sakai (JP); Shinji Shinjo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 73 days.

(21) Appl. No.: 15/774,244

(22) PCT Filed: Aug. 3, 2016

(86) PCT No.: PCT/JP2016/072870
§ 371 (c)(1),
(2) Date: May 7, 2018

(87) PCT Pub. No.: WO2017/090280
PCT Pub. Date: Jun. 1, 2017

(65) Prior Publication Data
US 2018/0329533 A1 Nov. 15, 2018

(30) Foreign Application Priority Data
Nov. 25, 2015 (JP) .................. 2015-230108

(51) Int. Cl.
*G06F 3/041* (2006.01)
*G06F 3/044* (2006.01)
*G06F 3/038* (2013.01)
*G06F 3/0354* (2013.01)

(52) U.S. Cl.
CPC ............ *G06F 3/044* (2013.01); *G06F 3/0383* (2013.01); *G06F 3/03545* (2013.01); *G06F 3/0416* (2013.01)

(58) Field of Classification Search
CPC ....................................... G06F 3/041
See application file for complete search history.

(56) References Cited

U.S. PATENT DOCUMENTS

2012/0268416 A1* 10/2012 Pirogov ................ G06F 3/0416
345/174
2014/0104236 A1* 4/2014 Hamaguchi ........... G06F 3/0416
345/174

(Continued)

FOREIGN PATENT DOCUMENTS

JP 2015-032234 A 2/2015

*Primary Examiner* — Roy P Rabindranath
(74) *Attorney, Agent, or Firm* — ScienBiziP, P.C.

(57) ABSTRACT

Capacitance distribution between each of detection electrodes and a stylus pen on a touch panel is detected with a simple configuration. A read step and a detection step are included. In the read step, a switch element selected among a plurality of drive sense switch elements (DST) between detection electrodes (E) and drive sense lines (DS) aligned in an X-axis direction based on a code sequence via control lines (DSS) aligned in a Y-axis direction is made to turn on, and a linear sum signal is read from each of the detection electrodes (E). In the detection step, a capacitance is detected.

11 Claims, 8 Drawing Sheets

(56) References Cited

U.S. PATENT DOCUMENTS

2014/0132562 A1* 5/2014 Miyamoto ............ G06F 3/0418
  345/174
2016/0110022 A1* 4/2016 Kanazawa ............. G06F 3/044
  345/174

* cited by examiner

| | phase0 | phase1 |
|---|---|---|
| AFE0 | DS1 – DS0 | DS2 – DS1 |
| AFE1 | DS3 – DS2 | DS4 – DS3 |
| AFE2 | DS5 – DS4 | DS6 – DS5 |
| AFE3 | DS7 – DS6 | DS8 – DS7 |
| AFE4 | DS9 – DS8 | DS10 – DS9 |
| AFE5 | DS11 – DS10 | DS12 – DS11 |
| AFE6 | DS13 – DS12 | DS14 – DS13 |
| AFE7 | DS15 – DS14 | DS16 – DS15 |
| AFE8 | DS17 – DS16 | DS18 – DS17 |
| AFE9 | DS19 – DS18 | DS20 – DS19 |
| AFE10 | DS21 – DS20 | DS22 – DS21 |
| AFE11 | DS23 – DS22 | DS24 – DS23 |
| AFE12 | DS25 – DS24 | DS26 – DS25 |
| AFE13 | DS27 – DS26 | DS28 – DS27 |
| AFE14 | DS29 – DS28 | DS30 – DS29 |
| AFE15 | DS31 – DS30 | |

FIG. 3B

| | phase0 | phase1 |
|---|---|---|
| AFE0 | DS2 – DS0 | DS4 – DS2 |
| AFE1 | DS3 – DS1 | DS5 – DS3 |
| AFE2 | DS6 – DS4 | DS8 – DS6 |
| AFE3 | DS7 – DS5 | DS9 – DS7 |
| AFE4 | DS10 – DS8 | DS12 – DS10 |
| AFE5 | DS11 – DS9 | DS13 – DS11 |
| AFE6 | DS14 – DS12 | DS16 – DS14 |
| AFE7 | DS15 – DS13 | DS17 – DS15 |
| AFE8 | DS18 – DS16 | DS20 – DS18 |
| AFE9 | DS19 – DS17 | DS21 – DS19 |
| AFE10 | DS22 – DS20 | DS24 – DS22 |
| AFE11 | DS23 – DS21 | DS25 – DS23 |
| AFE12 | DS26 – DS24 | DS28 – DS26 |
| AFE13 | DS27 – DS25 | DS29 – DS27 |
| AFE14 | DS30 – DS28 | |
| AFE15 | DS31 – DS29 | |

FIG. 3C

| | phase0 | phase1 |
|---|---|---|
| AFE0 | DS4 – DS0 | DS8 – DS4 |
| AFE1 | DS5 – DS1 | DS9 – DS5 |
| AFE2 | DS6 – DS2 | DS10 – DS6 |
| AFE3 | DS7 – DS3 | DS11 – DS7 |
| AFE4 | DS12 – DS8 | DS16 – DS12 |
| AFE5 | DS13 – DS9 | DS17 – DS13 |
| AFE6 | DS14 – DS10 | DS18 – DS14 |
| AFE7 | DS15 – DS11 | DS19 – DS15 |
| AFE8 | DS20 – DS16 | DS24 – DS20 |
| AFE9 | DS21 – DS17 | DS25 – DS21 |
| AFE10 | DS22 – DS18 | DS26 – DS22 |
| AFE11 | DS23 – DS19 | DS27 – DS23 |
| AFE12 | DS28 – DS24 | |
| AFE13 | DS29 – DS25 | |
| AFE14 | DS30 – DS26 | |
| AFE15 | DS31 – DS27 | |

FIG. 4

| | phase0 | phase1 |
|---|---|---|
| AFE0 | ( DS3+DS2 )−( DS1+DS0 ) | ( DS5+DS4 )−( DS3+DS2 ) |
| AFE1 | ( DS7+DS6 )−( DS5+DS4 ) | ( DS9+DS8 )−( DS7+DS6 ) |
| AFE2 | (DS11+DS10)−( DS9+DS8 ) | (DS13+DS12)−(DS11+DS10) |
| AFE3 | (DS15+DS14)−(DS13+DS12) | (DS17+DS16)−(DS15+DS14) |
| AFE4 | (DS19+DS18)−(DS17+DS16) | (DS21+DS20)−(DS19+DS18) |
| AFE5 | (DS23+DS22)−(DS21+DS20) | (DS25+DS24)−(DS23+DS22) |
| AFE6 | (DS27+DS26)−(DS25+DS24) | (DS29+DS28)−(DS27+DS26) |
| AFE7 | (DS31+DS30)−(DS29+DS28) | |

-- Related Art --

FIG. 9

CAPACITANCE DETECTION METHOD, POSITION DETECTION METHOD, TOUCH PANEL CONTROLLER, AND ELECTRONIC DEVICE

TECHNICAL FIELD

The present invention relates to a capacitance detection method using a touch panel that detects a capacitance or a change in capacitance between each of a plurality of electrodes and a stylus pen applying an AC voltage to the electrode, a position detection method, a touch panel controller, and an electronic device.

BACKGROUND ART

PTL 1 discloses a capacitance detection method using a touch panel that detects a capacitance or a change in capacitance between each of a plurality of electrodes and a detected subject.

Figure 9:
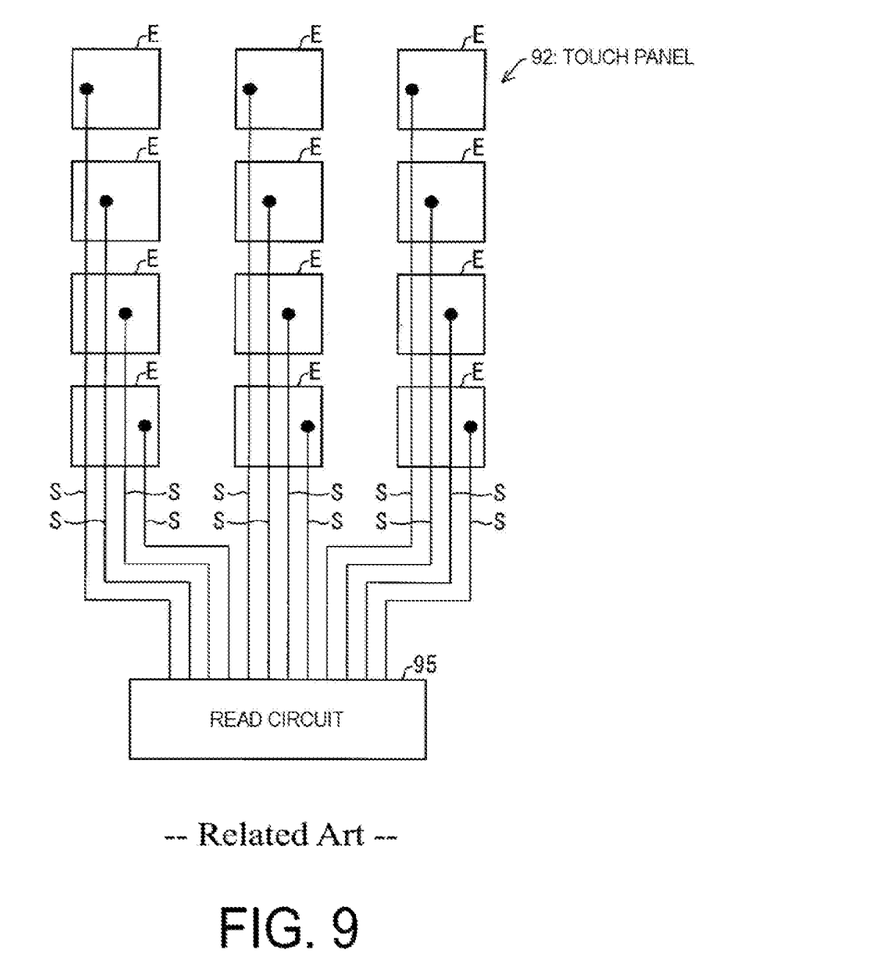
FIG. 9 is a circuit diagram illustrating a configuration of a touch panel system in the related art.

FIG. 9 is a circuit diagram illustrating a configuration of a touch panel system in the related art. A touch panel 92 includes 12 detection electrodes E arranged in four rows and three columns in matrix with an interval between each other. A sense line S coupled to each of the detection electrodes E is connected to a read circuit 95.

In a capacitance detection method using the touch panel 92 formed as described above, a signal corresponding to an electrostatic capacity between each of the detection electrodes E and a detected subject passes through the corresponding sense line S and is read by the read circuit 95. Then, distribution of the electrostatic capacity or a change in electrostatic capacity on the touch panel 92 is detected.

CITATION LIST

Patent Literature

PTL 1: JP 2015-32234 A (published Feb. 16, 2015).

SUMMARY OF INVENTION

Technical Problem

However, the above-mentioned related art illustrated in FIG. 9 needs to install the sense line S from each of all the detection electrodes E of the touch panel 92 to the read circuit 95 in order to detect distribution of an electrostatic capacity or a change in electrostatic capacity on the touch panel 92. Thus, in view of upsizing of the touch panel, a wiring line resistance of the sense line S increases, and the number of channels (the number of sense lines 5) of the read circuit 95 increases in proportion to a result of multiplying the number of rows by the number of columns of the detection electrodes E. This leads to a complicated configuration of a touch panel system.

An object of the present invention is to provide a capacitance detection method capable of detecting capacitance distribution between each of detection electrodes and a detected subject on a touch panel with a simple configuration, a position detection method, a touch panel controller, and an electronic device.

Solution to Problem

To solve the above-described problems, a capacitance detection method according to one aspect of the present invention is a capacitance detection method for detecting a capacitance or a change in capacitance between each of a plurality of electrodes arranged in matrix and a stylus pen applying an AC voltage to the electrode. The capacitance detection method includes: a read step of turning on a switch element selected among a plurality of switch elements between the plurality of electrodes and a plurality of signal lines aligned in a first direction of the matrix based on a code sequence via a plurality of control lines aligned in a second direction intersecting the first direction and reading a linear sum signal along each of the plurality of signal lines from each of the plurality of electrodes; and a detection step of detecting the capacitance or the change in capacitance by a sum-of-product calculation of the linear sum signal and a decoding code sequence corresponding to the code sequence.

A position detection method according to one aspect of the present invention is a position detection method for detecting a capacitance or a change in capacitance between each of a plurality of electrodes arranged in matrix and a stylus pen applying an AC voltage to the electrode and detecting a position of the stylus pen on a touch panel. The position detection method includes the above-described capacitance detection method, and a position detection step of detecting a position of the stylus pen on the touch panel based on the capacitance or the change in capacitance that has been detected in the detection step.

A touch panel controller according to one aspect of the present invention is a touch panel controller configured to control a touch panel by detecting a capacitance or a change in capacitance between each of a plurality of electrodes arranged in matrix and a stylus pen applying an AC voltage to the electrode. The touch panel controller includes: a read circuit configured to turn on a switch element selected among a plurality of switch elements between the plurality of electrodes and a plurality of signal lines aligned in a first direction of the matrix based on a code sequence via a plurality of control lines aligned in a second direction intersecting the first direction and read a linear sum signal along each of the plurality of signal lines from each of the plurality of electrodes; and a detection circuit configured to detect the capacitance or the change in capacitance by a sum-of-product calculation of the linear sum signal and a decoding code sequence corresponding to the code sequence.

An electronic device according to one aspect of the present invention includes the above-described touch panel controller.

Advantageous Effects of Invention

Each aspect of the present invention exhibits an effect capable of detecting a position of the stylus pen even on the touch panel having a simple configuration that reads a signal only from one direction. Furthermore, such an effect is exhibited that noise superimposed on the plurality of signal lines has a smaller adverse effect than a configuration in which a switch element is not selected among a plurality of switch elements on the basis of a code sequence (for example, a configuration in which a code sequence is a unit matrix) in detection of capacitance distribution.

BRIEF DESCRIPTION OF DRAWINGS

FIGS. 2A and 2B illustrate an example of a drive code of a drive circuit of a touch panel controller provided in the touch panel system.

FIGS. 3A to 3C are diagrams for describing a method for reading a difference between a linear sum signal along one of drive sense lines of a touch panel provided in the touch panel system and a linear sum signal along another one of the drive sense lines. FIG. 3A illustrates an example of reading a difference between the drive sense lines adjacent to each other (next to each other). FIG. 3B illustrates an example of reading a difference between the drive sense lines with one line therebetween. FIG. 3C illustrates an example of reading a difference between the drive sense lines with three lines therebetween.

DESCRIPTION OF EMBODIMENTS

A detailed description follows regarding embodiments of the present invention.

First Embodiment

Configuration of Touch Panel System 1

Figure 1A:
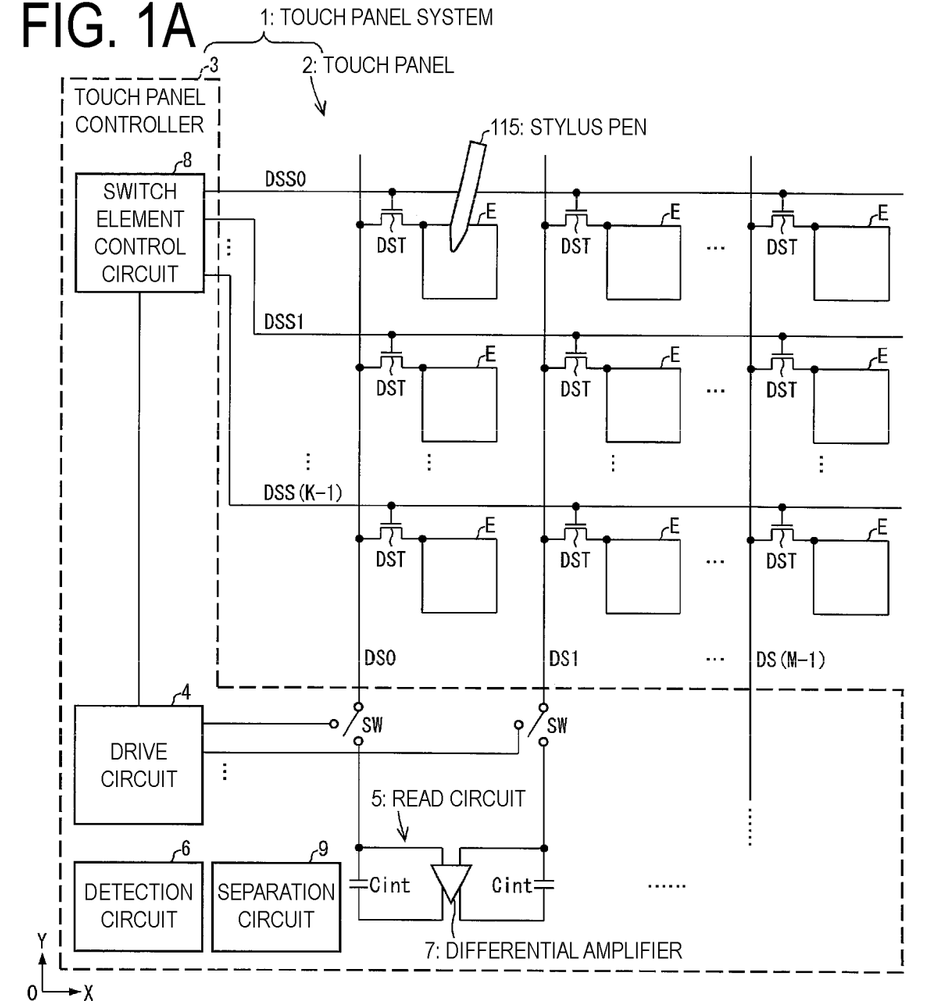
FIGS. 1A to 1D are circuit diagrams illustrating a configuration of a touch panel system according to a first embodiment.
Figure 1B:
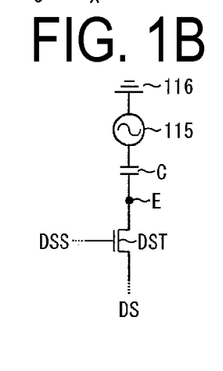
Figure 1C:
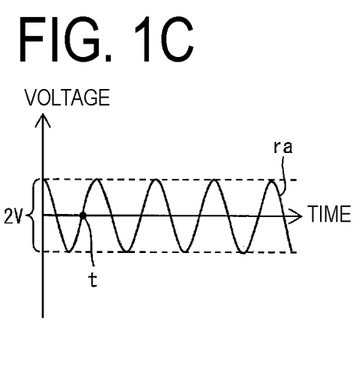
Figure 1D:
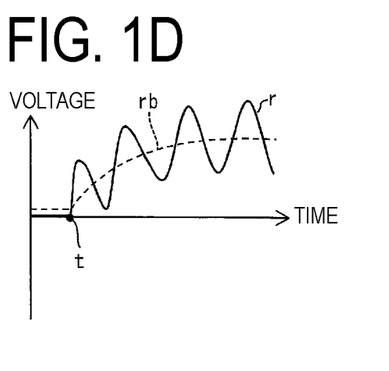

FIGS. 1A to 1D are circuit diagrams illustrating a configuration of a touch panel system 1 according to a first embodiment. FIG. 1A illustrates an overall configuration. FIG. 1B illustrates an equivalent configuration with a focus on a stylus pen 115. FIG. 1C illustrates a voltage waveform applied to a detection electrode E with the stylus pen 115. FIG. 1D illustrates an output voltage waveform of a read circuit 5 read via a drive sense line DS.

As illustrated in FIG. 1A, the touch panel system 1 includes a touch panel 2, a touch panel controller 3 that controls the touch panel 2, and the stylus pen 115.

The touch panel 2 includes K (where K is plural) control lines DSS0 to DSS(K−1) (control lines) and M (where M is plural) drive sense lines DS0 to DS(M−1) (signal lines) intersecting each other. The touch panel 2 also includes (K×M) detection electrodes E (electrodes) that correspond to intersections of the K control lines DSS0 to DSS(K−1) and the M drive sense lines DS0 to DS(M−1) and that are arranged in matrix.

A drive sense switch element DST (switch element) is formed between each of the detection electrodes E and the corresponding drive sense line. The drive sense switch element DST is formed of a transistor. A gate of each of the drive sense switch elements DST is coupled to the corresponding control line.

The touch panel 2 is provided for detecting a capacitance or a change in capacitance between each of the detection electrodes E and the stylus pen 115.

The touch panel controller 3 includes a drive circuit 4 connected to the M drive sense lines DS0 to DS(M−1) via switching switches SW, a switch element control circuit 8 connected to the K control lines DSS0 to DSS(K−1), a plurality of read circuits 5 connected to the drive sense lines adjacent to each other, a detection circuit 6 that detects a capacitance or a change in capacitance between each of the detection electrodes E and the detected subject on the basis of an output of each of the read circuits 5, and a separation circuit 9 that separates a DC component and an AC component from an output voltage waveform of the read circuit 5.

Note that the drive circuit 4 and the switching switches SW are not necessary. However, the touch panel 2 does not only detect a capacitance or a change in capacitance between each of the detection electrodes E and the stylus pen 115, and the touch panel controller 3 may also include the drive circuit 4 and the switching switches SW when detecting a capacitance or a change in capacitance between each of the detection electrodes E and a finger, a pen, or the like.

Each of the read circuits 5 includes a differential amplifier 7 that amplifies a difference between outputs of the drive sense lines adjacent to each other and a pair of integral capacitances Cint provided between one input and one output of the differential amplifier 7 and between another input and another output thereof. Note that each of the read circuits 5 may include a switch that short-circuits one terminal and the other terminal of the integral capacitances Cint and resets a state of the differential amplifier 7 (not illustrated).

Reference Action of Touch Panel System 1

The touch panel system 1 formed as described above may work as follows.

First, the switch element control circuit 8 turns on the drive sense switch element DST selected among the (K×M) drive sense switch elements DST on the basis of a factor "1" of a code sequence of K rows and N columns via the K control lines DSS0 to DSS(K−1). At this time, the drive sense switch elements DST that are not selected are off. The switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with +V (for example, power source voltage) through the selected drive sense switch element DST (drive step).

Next, the switch element control circuit 8 turns on the drive sense switch element DST selected among the (K×M) drive sense switch elements DST on the basis of a factor "−1" of the code sequence of K rows and N columns via the K control lines DSS0 to DSS(K−1). At this time, the drive sense switch elements DST that are not selected are off. Herein, the switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with −V (for example, ground voltage) through the selected drive sense switch element DST.

Next, the switch element control circuit 8 turns off the (K×M) drive sense switch elements DST via the K control lines DSS0 to DSS(K−1) and brings each of the detection electrodes E into a floating state. The switching switches SW also switch in such a way to connect the read circuits 5 and the M drive sense lines DS0 to DS(M−1). Subsequently, the switch element control circuit 8 turns on the (K×M) drive sense switch elements DST via the K control lines DSS0 to DSS(K−1).

Each of the read circuits 5 amplifies a difference between linear sum signals based on an electric charge of each of the detection electrodes E read along the adjacent drive sense line via the drive sense switch element DST turning on. Next, the detection circuit 6 detects a capacitance or a change in capacitance between each of the detection electrodes E of the touch panel 2 and a detected subject on the basis of a sum-of-product calculation of the difference between the linear sum signals output from each of the read circuits 5 and the code sequence. Subsequently, the detection circuit 6 detects a position of the detected subject on the touch panel 2 on the basis of the detected capacitance or the detected change in capacitance.

In the above-mentioned touch panel 92 in the related art with reference to FIG. 9, the number of channels (the number of sense lines 5) of the read circuit 95 is massive, so that in sequential drive, the greater number of sense lines S increases time required for scanning or the same scanning time reduces the number of sense lines S that can be scanned. However, in a case where the touch panel 2 in which each of the detection electrodes E is provided with the drive sense switch element DST and the switching switch SW as in the first embodiment is driven in parallel, the touch panel can be scanned in a short time with a simple configuration.

In a case where the touch panel 2 is driven in parallel, it is also more advantageous in terms of an S/N ratio than the sequential drive.

In recent years, a reduction in size of a liquid crystal module typified by a structure, which is called in-cell, including a sensor of a touch panel formed inside a display panel has been advancing, and a distance between a liquid crystal panel and the touch panel has been reduced. Thus, an influence of noise by the touch panel on the liquid crystal panel has not been negligible, and a need to drive the touch panel and the liquid crystal panel in a time-division manner has been increasing. Consequently, drive time assigned to the touch panel is limited, so that driving the touch panel in parallel is more advantageous than the sequential drive.

For the in-cell, the touch panel and the liquid crystal panel are integrally produced in the step of producing the liquid crystal panel, and thus the drive sense switch element DST of the touch panel 2 is easily installed in the touch panel 2. In other words, the transistor forming the drive sense switch element DST can be produced with the same mask as a mask for the liquid crystal panel, so that an increase in cost of an initial investment is reduced even in a case where the drive sense switch element DST is provided in the touch panel.

Furthermore, the plurality of detection electrodes E arranged in matrix in the touch panel 2 may also be used as common electrodes of the liquid crystal panel. When the touch panel and the liquid crystal panel are driven in the time-division manner, a voltage for driving the touch panel is applied to the plurality of detection electrodes E in a drive period assigned to the touch panel, and the detection electrodes E function as electrodes for driving the liquid crystal panel in a drive period assigned to the liquid crystal panel.

As described above, the drive circuit 4 charges the detection electrodes E or any voltage source previously charges the detection electrodes based on a DC voltage, so that a voltage waveform of a DC component based on the DC voltage due to the charging may be superimposed on a voltage waveform of an AC component based on an AC voltage oscillating from the stylus pen 115 described below in the drive sense lines DS0 to DS(M−1).

Main Action of Touch Panel System 1

As illustrated in FIG. 1B, the stylus pen 115 can be regarded as an AC voltage source. The stylus pen 115 is held by a user 116 of the touch panel 2 and pressed against the touch panel 2. At this time, the user 116 can be assumed as a ground at a potential of approximately zero. An electrostatic capacity C (capacitance) is generated between the stylus pen 115 in contact with or in close proximity to the touch panel 2 and each of the detection electrodes E of the touch panel 2.

As illustrated in FIG. 1C, the stylus pen 115 applies an AC voltage to the detection electrode E to inject a signal to the detection electrode E via the electrostatic capacity C.

In FIG. 1B, the drive sense switch element DST is made to turn on/off via a control line DSS. Note that the control line DSS indicates any one of the K control lines DSS0 to DSS(K−1) illustrated in FIG. 1A.

When the drive sense switch element DST turns on, a signal based on the AC voltage oscillating from the stylus pen 115 flows through a drive sense line DS. Note that the drive sense line DS indicates any one of the M drive sense lines DS0 to DS(M−1) illustrated in FIG. 1A.

In FIG. 1C, time at which the drive sense switch element DST turns on is indicated as t. A voltage waveform of the AC voltage oscillating from the stylus pen 115 is indicated as ra.

In a case where the drive circuit 4 has already charged the detection electrode E with the DC voltage as described above at the time t, a voltage waveform r in which a voltage waveform of an AC component based on the voltage waveform ra of the AC voltage is superimposed on a voltage waveform rb of a DC component based on the DC voltage is output from the read circuit 5 read via the drive sense line DS, as illustrated in FIG. 1D.

The separation circuit 9 illustrated in FIG. 1A can separate the voltage waveform r obtained from the drive sense line DS into the voltage waveform rb of the DC component based on the DC voltage and the voltage waveform of the AC component based on the AC voltage.

Specific Example of Code Sequence

Figure 2A:
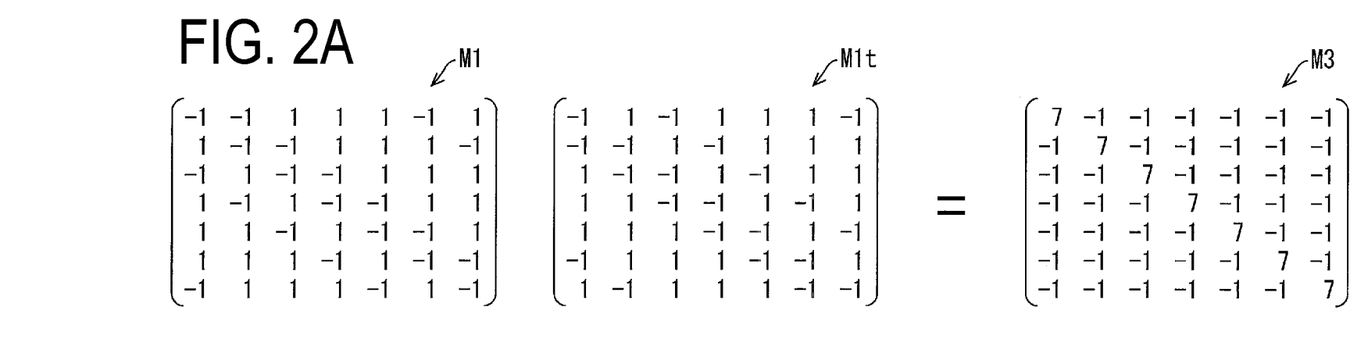
FIG. 2A illustrates an example of a drive code driving at two values of +1/−1 and a decoding code.
Figure 2B:
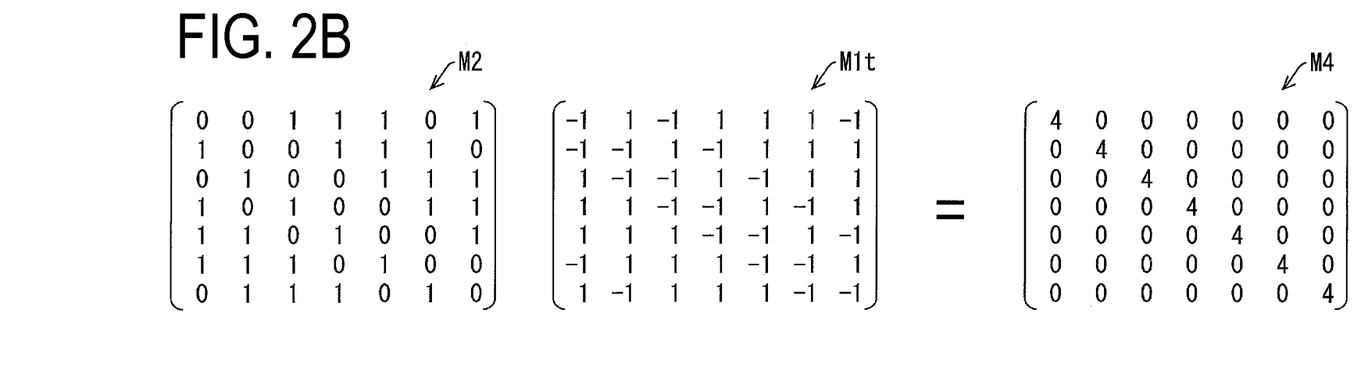
FIG. 2B illustrates an example of a drive code driving at only +1 and a decoding code.

FIGS. 2A and 2B illustrate an example of a drive code (code sequence) of the drive circuit 4 of the touch panel controller 3 provided in the touch panel system 1. FIG. 2A illustrates an example of a drive code driving at two values of +1/−1 and a decoding code. FIG. 2B illustrates an example of a drive code driving at only +1 and a decoding code.

With reference to FIG. 2A, a code sequence M1 of an M sequence for driving seven control lines DSS0 to DSS(K−1) at two values of "+1" and "−1" by the switch element control circuit 8, a decoding code sequence M1$t$ used for a sum-of-product calculation with a linear sum signal for decoding in the detection circuit 6 and formed by transposing the code sequence M1, and a code sequence M3 being a result of the sum-of-product calculation of the code sequence M1 and the decoding code sequence M1$t$ are illustrated.

With reference to FIG. 2B, a code sequence M2 for driving control lines DSS0 to DSS6 at only "+1" by the switch element control circuit 8, the code sequence M1$t$ used for a sum-of-product calculation with a linear sum signal for decoding in the detection circuit 6 and formed by transposing the code sequence M1, and a code sequence M4 being a result of the sum-of-product calculation of the code sequence M2 and the decoding code sequence M t are illustrated.

Parallel Reading Based on Code Sequence

When the stylus pen 115 is used, a signal corresponding to a factor in an i-th row of a column vector of the code sequence M2 illustrated in FIG. 2B is provided to a control line DSS(i). Herein, i is an integer from 0 to 6.

When a factor "1" (first value) is provided to the control line, the drive sense switch element DST connected to the control line turns on. When a factor "0" (second value) is provided to the control line, the drive sense switch element DST connected to the control line turns off.

Hereinafter, an electrostatic capacity between a detection electrode E and a detected subject is described as Ci (i=0 to 6). The detection electrode E is connected to one drive sense line of the drive sense lines DS0 to DS(M−1) illustrated in FIG. 1A via the drive sense switch element DST and is an i-th detection electrode E from an Y-axis normal direction side.

An output read from the above-mentioned one drive sense line when the signal corresponding to the factor in the i-th row of the column vector of the code sequence M2 illustrated in FIG. 2B is provided to the control lines DSS0 to DSS6 is described as Yi (i=0 to 6).

At this time, a relationship among the code sequence M2, an electrostatic capacity vector formed of the electrostatic capacity Ci, and an output vector formed of the output Yi (linear sum signal) is expressed by the following expression.

$(C0, C1, \ldots, C6) * M2 * (-V/Cint) = (Y0, Y1, \ldots, Y6)$   (Expression 1)

Note that the read circuit 5 illustrated in FIG. 1A outputs a difference component of capacitances that are an electrostatic capacity Cij (i=0 to 6, j=0 to (M−2)) between a j-th drive sense line and a detected subject and an electrostatic capacity Ci (j+1) between a (j+1)-th drive sense line and the detected subject. Herein, it is assumed that Ci=Ci (j+1)−Cij to enhance readability.

A scalar V means an amplitude of the AC voltage applied to the detection electrode E with the stylus pen 115. Cint means an integral capacity of the read circuit 5.

The output Yi fluctuates in terms of time according to the AC voltage applied to the detection electrode E with the stylus pen 115 like the voltage waveform r illustrated in FIG. 1D. The voltage waveform fluctuating in terms of time is separated into a voltage waveform of a DC component based on a DC voltage and a voltage waveform of an AC component based on an AC voltage. An amplitude of the voltage waveform of the AC component based on the AC voltage is assumed as a value of the output Yi.

Note that a voltage value of the DC component based on the DC voltage may be used as a value of the output Yi.

Acquisition of Capacity Distribution by Complex Calculation

The following expression is obtained by multiplying both sides of Expression 1 from the right side by a matrix M it formed by transposing the decoding code sequence M1t illustrated in FIGS. 2A and 2B. For the sake of simplification herein, (−V/Cint) as a scalar quantity is omitted.

$(C0, C1, \ldots, C6) \cdot M2 \cdot M1t = (Y0, Y1, \ldots, Y6) \cdot M1t$

Herein, as illustrated in FIG. 2B, (M2*M1t) on the left side is equal to a value obtained by multiplying a unit matrix by 4. Thus, the following expression is obtained.

$(C0, C1, \ldots, C6) \cdot 4E = (Y0, Y1, \ldots, Y6) \cdot M1t$

The following expression is obtained by dividing both sides of the expression above by 4.

$(C0, C1, \ldots, C6) \cdot E = (Y0, Y1, \ldots, Y6) M1t/4$

As a result of the expression above, an electrostatic capacity C0 is obtained as in the following expression. For the sake of simplification herein, (¼) as a scalar quantity is omitted.

$C0 = (-Y0 - Y1 + Y2 + Y3 + Y4 - Y5 + Y6)$   (Expression 2)

In other words, the electrostatic capacity C0 is obtained from a sum-of-product calculation of the decoding code sequence M1t corresponding to the code sequence M2 and the output Yi being a linear sum signal. Note that an electrostatic capacity Ci (i=1 to 6) is also similarly obtained.

The "decoding code sequence M t corresponding to the code sequence M2" means that a matrix that is obtained by multiplying the code sequence M2 by the decoding code sequence M t is equal to a matrix that is obtained by multiplying the unit matrix by a scalar.

As described above, it is possible to obtain capacity distribution in the Y-axis direction being the direction along the drive sense line. It is also possible to obtain capacity distribution in the X-axis direction being the direction along the control line by acquiring the above-mentioned capacity distribution, which is acquired from one drive sense line of the drive sense lines DS0 to DS(M−1), from another drive sense line.

Effect of Touch Panel System 1

The touch panel system 1 performs a method for detecting a capacitance including the following steps.

Read step: a step of turning on a drive sense switch element DST selected among a plurality of drive sense switch elements DST (switch elements) between a plurality of detection electrodes E and a plurality of drive sense lines DS0 to DS(M−1) (signal lines) aligned in an X-axis direction (first direction) of a matrix based on a code sequence via a plurality of control lines DSS0 to DSS(K−1) aligned in a Y-axis direction (second direction) and reading a linear sum signal based on an electric charge of each of the detection electrodes E along each of the plurality of signal lines.

Detection step: a step of detecting a capacitance or a change in capacitance between each of the detection electrodes E and the stylus pen 115 by a sum-of-product calculation of the above-described linear sum signal and a decoding code sequence corresponding to the above-described code sequence.

As described above, a drive sense switch element DST selected among the plurality of drive sense switch elements DST is made to turn on, and a linear sum signal based on an electric charge of each of the detection electrodes E is read along each of the drive sense lines DS0 to DS(M−1). As a result, capacitance distribution between each of the detection electrodes E and the stylus pen 115 on the touch panel can be detected with a simple configuration.

Furthermore, in detection of capacitance distribution, noise superimposed on the drive sense lines DS0 to DS(M−1) has a smaller adverse effect than the related art in which one drive sense switch element DST is made to turn on every measurement of one output of the drive sense lines DS0 to DS(M−1), more specifically, a configuration in which a drive sense switch element DST is not selected among the plurality of drive sense switch elements DST on the basis of a code sequence (for example, a configuration in which a code sequence is a unit matrix like a comparative example described later).

Reference Example

A touch panel system (hereinafter referred to as a "touch panel system a") is a touch panel system that includes a stylus pen used to touch a touch panel including M first signal lines (where M is plural) and K second signal lines (where K is plural) intersecting the M first signal lines, and a touch panel controller configured to detect a position of the stylus pen. The touch panel controller includes: a first drive means for driving the stylus pen and generating a first pen signal on the basis of an electrostatic capacity between the stylus pen and each of the K second signal lines; a second drive means for driving the stylus pen and generating a second pen signal on the basis of an electrostatic capacity between the stylus pen and each of the M first signal lines; and a position detection means for detecting a position of the stylus pen along the first signal lines on the basis of the first pen signal generated by the first drive means and detecting a position of the stylus pen along the second signal lines on the basis of the second pen signal generated by the second drive means. The touch panel system 1 exhibits the above-described advantageous effects over the touch panel system a.

The touch panel in the touch panel system a includes the plurality of first signal lines and the plurality of second signal lines. When a position of the stylus pen is detected, the plurality of first signal lines need to be connected to read circuits in order to read the first pen signal on the basis of the electrostatic capacity between the stylus pen and each of the plurality of second signal lines. The plurality of second signal lines need to be connected to the read circuits in order to read the second pen signal on the basis of the electrostatic capacity between the stylus pen and each of the plurality of first signal lines.

As described above, the touch panel system a needs to switch between the signal lines connected to the read circuits when a position of the stylus pen is detected.

The touch panel 2 in the touch panel system 1 includes the drive sense lines DS0 to DS(M−1). The drive sense lines are connected to the read circuits 5 when a position of the stylus pen is detected. In other words, the touch panel system 1 does not need to switch between the signal lines connected to the read circuits when a position of the stylus pen is detected.

As described above, a position of the stylus pen can be detected even on the relatively simple touch panel having a simple configuration that reads a signal only from one direction in the touch panel system 1.

Comparative Example

When one drive sense switch element DST is made to turn on every measurement of one output Yi, a relationship between an electrostatic capacity vector and an output vector is expressed by the following expression.

$(C0,C1,\ldots,C6)*E*(-V/\text{Cint})=(Y0,Y1,\ldots,Y6)$

As a result of the expression above, an electrostatic capacity C0 is obtained as in the following expression. For the sake of simplification herein, (−V/Cint) as a scalar quantity is omitted.

$C0=Y0$ (Expression 3)

Herein, in a case where noise superimposed on each of the outputs Y0 to Y6 is uncorrelated, noise superimposed on the signal (−Y0−Y1+Y2+Y3+Y4−Y5+Y6) obtained from the sum-of-product calculation is a value obtained by dividing the noise superimposed on only the output Y0 by a square root of 7 (code length of code sequence).

Thus, as expressed in Expression 2, when the drive sense switch element. DST is selected on the basis of the code sequence to obtain an electrostatic capacity, noise superimposed on the drive sense line has a smaller adverse effect than the related art in which one drive sense switch element DST is made to turn on every measurement of one output Yi, as expressed in Expression 3.

Specific Example of Differential Reading

FIGS. 3A to 3C are diagrams for describing a method for reading a difference between a linear sum signal along one of the drive sense lines of the touch panel 2 provided in the touch panel system 1 and a linear sum signal along another one of the drive sense lines. FIG. 3A illustrates an example of reading a difference between the drive sense lines adjacent to each other (next to each other). FIG. 3B illustrates an example of reading a difference between the drive sense lines with one line therebetween. FIG. 3C illustrates an example of reading a difference between the drive sense lines with three lines therebetween.

With reference to FIG. 3A, an example of reading 32 drive sense lines DS0 to DS31 by 16 read circuits AFE0 to AFE15 is illustrated. The read circuits AFE0 to AFE15 each have the same configuration as that of the read circuit 5 illustrated in FIG. 1A.

First, at a timing phase 0, the read circuit AFE0 amplifies a difference between a linear sum signal from the drive sense line DS1 and a linear sum signal from the drive sense line DS0. Then, the read circuit AFE1 amplifies a difference between the drive sense line DS3 and the drive sense line DS2, and the read circuit AFE2 amplifies a difference between the drive sense line DS5 and the drive sense line DS4. Hereinafter, the read circuits AFE3 to AFE15 similarly amplify a difference between the adjacent drive sense lines.

At a next timing phase 1, the read circuit AFE0 amplifies a difference between the drive sense line DS2 and the drive sense line DS1. Then, the read circuit AFE1 amplifies a difference between the drive sense line DS4 and the drive sense line DS3, and the read circuit AFE2 amplifies a difference between the drive sense line DS6 and the drive sense line DS5. Hereinafter, the read circuits AFE3 to AFE14 similarly amplify a difference between the adjacent drive sense lines.

In the example illustrated in FIGS. 1A and 3A, the example in which the read circuit differentially amplifies the adjacent drive sense lines is illustrated. However, the present invention is not limited thereto. The sense lines that are not adjacent to each other with a plurality of lines therebetween may be differentially amplified.

FIG. 3B illustrates an example of reading a difference between the drive sense lines with one line therebetween.

First, at a timing phase 0, the read circuit AFE0 amplifies a difference between the drive sense line DS2 and the drive sense line DS0. Then, the read circuit AFE1 amplifies a difference between the drive sense line DS3 and the drive sense line DS1, and the read circuit AFE2 amplifies a difference between the drive sense line DS6 and the drive sense line DS4. Hereinafter, the read circuits AFE3 to AFE15 similarly amplify a difference between the drive sense lines with one line therebetween.

At a next timing phase 1, the read circuit AFE0 amplifies a difference between the drive sense line DS4 and the drive sense line DS2. Then, the read circuit AFE1 amplifies a difference between the drive sense line DS5 and the drive sense line DS3, and the read circuit AFE2 amplifies a difference between the drive sense line DS8 and the drive sense line DS6. Hereinafter, the read circuits AFE3 to AFE13 similarly amplify a difference between the drive sense lines with one line therebetween.

FIG. 3C illustrates an example of reading a difference between the drive sense lines with three lines therebetween.

First, at a timing phase 0, the read circuit AFE0 amplifies a difference between the drive sense line DS4 and the drive sense line DS0. Then, the read circuit AFE1 amplifies a difference between the drive sense line DS5 and the drive sense line DS1, and the read circuit AFE2 amplifies a difference between the drive sense line DS6 and the drive sense line DS2. Hereinafter, the read circuits AFE3 to AFE15 similarly amplify a difference between the drive sense lines with three lines therebetween.

At a next timing phase 1, the read circuit AFE0 amplifies a difference between the drive sense line DS8 and the drive sense line DS4. Then, the read circuit AFE1 amplifies a difference between the drive sense line DS9 and the drive sense line DS5, and the read circuit AFE2 amplifies a difference between the drive sense line DS10 and the drive sense line DS6. Hereinafter, the read circuits AFE3 to AFE11 similarly amplify a difference between the drive sense lines with three lines therebetween.

By such differential reading that reads a difference between the drive sense lines, noise on one of the drive sense lines and noise on the other drive sense line can cancel each other by subtraction, so that the touch panel system resistant to noise can be formed.

A difference is read between the drive sense lines in the differential reading, which results in a decreased value of a read signal. Thus, the differential reading is advantageous in that a gain of the differential amplifier 7 can be increased more than a gain in a case of single reading.

The differential amplification described above also acts advantageously with the use of the stylus pen 115.

Figure 4:
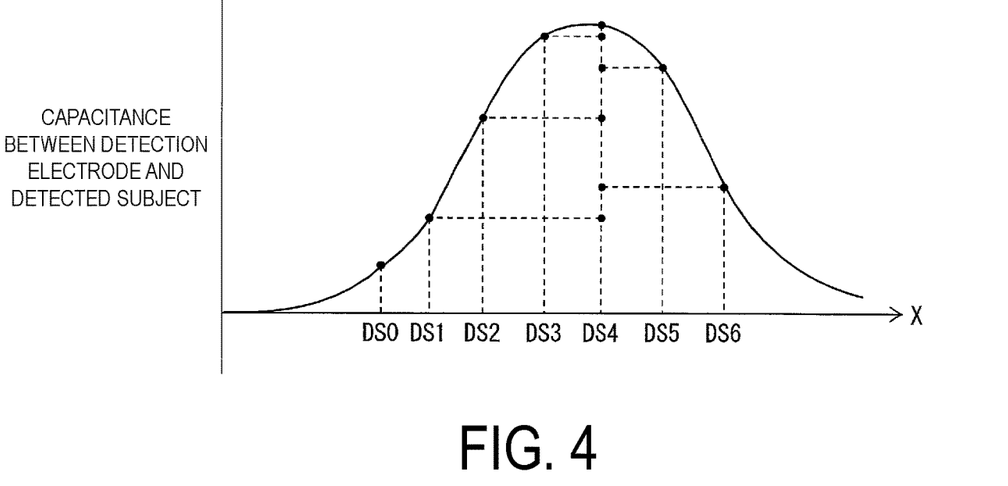
FIG. 4 is a graph showing capacitance distribution between a detection electrode corresponding to each of the drive sense lines and a detected subject.

FIG. 4 is a graph showing capacitance distribution between the detection electrode E corresponding to each of the drive sense lines and a detected subject.

In a hover operation operated by a detected subject such as a finger slightly away from the touch panel 2, distribution of a capacitance between the detection electrode E and the detected subject in a plane direction of the touch panel 2 is distribution as shown in FIG. 4.

A signal in which a difference between linear sum signals from the adjacent drive sense lines is amplified has a small value, but an obtained value of the differential signal can be increased as shown in FIG. 4 by positioning the drive sense lines having a difference amplified away from each other as illustrated in FIGS. 3B and 3C.

Figure 5:
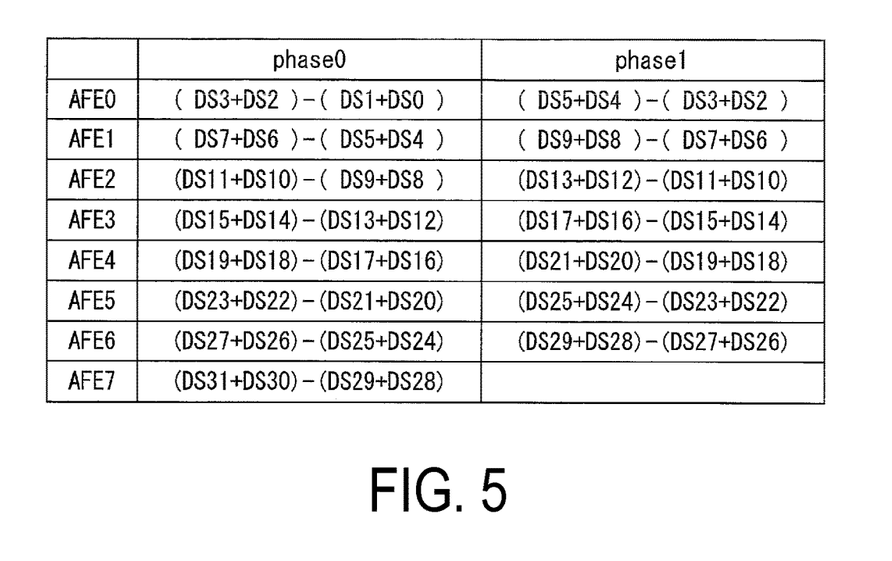
FIG. 5 is a diagram for describing a method for reading a difference between a linear sum signal based on a group including the plurality of drive sense lines and another linear sum signal based on another group including the other plurality of drive sense lines.

FIG. 5 is a diagram for describing a method for reading a difference between a linear sum signal based on a group including the plurality of drive sense lines and another linear sum signal based on another group including the other plurality of drive sense lines.

The above-mentioned embodiment illustrates the example of reading a difference between the linear sum signal along one of the drive sense lines and the other linear sum signal along the other drive sense line. However, the present invention is not limited thereto. A difference may be read between a linear sum signal based on a group including the plurality of drive sense lines and another linear sum signal based on another group including the other plurality of drive sense lines.

FIG. 5 illustrates an example of making a group of a $(2n)^{th}$ drive sense line and a $(2n+1)^{th}$ drive sense line and reading a difference between grouped drive sense line groups.

First, at a timing phase 0, the drive sense lines DS3 and DS2 are formed into a group, and the drive sense lines DS1 and DS0 are formed into a group. Then, the read circuit AFE0 amplifies a difference between a sum of a linear sum signal from the drive sense line DS3 and a linear sum signal from the drive sense line DS2 and a sum of a linear sum signal from the drive sense line DS1 and a linear sum signal from the drive sense line DS0. The drive sense lines DS7 and DS6 are formed into a group, and the drive sense lines DS5 and DS4 are formed into a group. Then, the read circuit AFE1 amplifies a difference between a sum of a linear sum signal from the drive sense line DS7 and a linear sum signal from the drive sense line DS6 and a sum of a linear sum signal from the drive sense line DS5 and a linear sum signal from the drive sense line DS4. The drive sense lines DS11 and DS10 are formed into a group, and the drive sense lines DS9 and DS8 are formed into a group. Then, the read circuit AFE2 amplifies a difference between a sum of the drive sense line DS1 and the drive sense line DS10 and a sum of the drive sense line DS9 and the drive sense line DS8. Hereinafter, the read circuits AFE3 to AFE7 similarly amplify a difference between the grouped drive sense line groups.

At a next timing phase 1, the drive sense lines DS5 and DS4 are formed into a group, and the drive sense lines DS3 and DS2 are formed into a group. Then, the read circuit AFE0 amplifies a difference between a sum of a linear sum signal from the drive sense line DS5 and a linear sum signal from the drive sense line DS4 and a sum of a linear sum signal from the drive sense line DS3 and a linear sum signal from the drive sense line DS2. The drive sense lines DS9 and DS8 are formed into a group, and the drive sense lines DS7 and DS6 are formed into a group. Then, the read circuit AFE1 amplifies a difference between a sum of a linear sum signal from the drive sense line DS9 and a linear sum signal from the drive sense line DS8 and a sum of a linear sum signal from the drive sense line DS7 and a linear sum signal from the drive sense line DS6. The drive sense lines DS13 and DS12 are formed into a group, and the drive sense lines DS11 and DS10 are formed into a group. Then, the read circuit AFE2 amplifies a difference between a sum of the drive sense line DS13 and the drive sense line DS12 and a sum of the drive sense line DS11 and the drive sense line DS10. Hereinafter, the read circuits AFE3 to AFE6 similarly amplify a difference between the grouped drive sense line groups.

The differential reading reads a difference component between the drive sense lines, so that only a small signal can be acquired. However, as described above, the drive sense lines are brought together into a group and then read, so that a signal component read from the drive sense lines can be increased.

The reading of a signal by forming a group described above also acts advantageously when the stylus pen 115 is used.

Note that the above-mentioned embodiment illustrates the example of turning on the drive sense switch elements DST via all the control lines DSS0 to DSS(K−1) and driving the drive sense lines DS0 to DS(M−1), but the present invention is not limited thereto. The switch element control circuit 8, the drive circuit 4, and the switching switches SW may form so as to turn on the drive sense switch elements DST for at least two of the control lines and drive the drive sense lines DS0 to DS(M−1).

Second Embodiment

Figure 6:
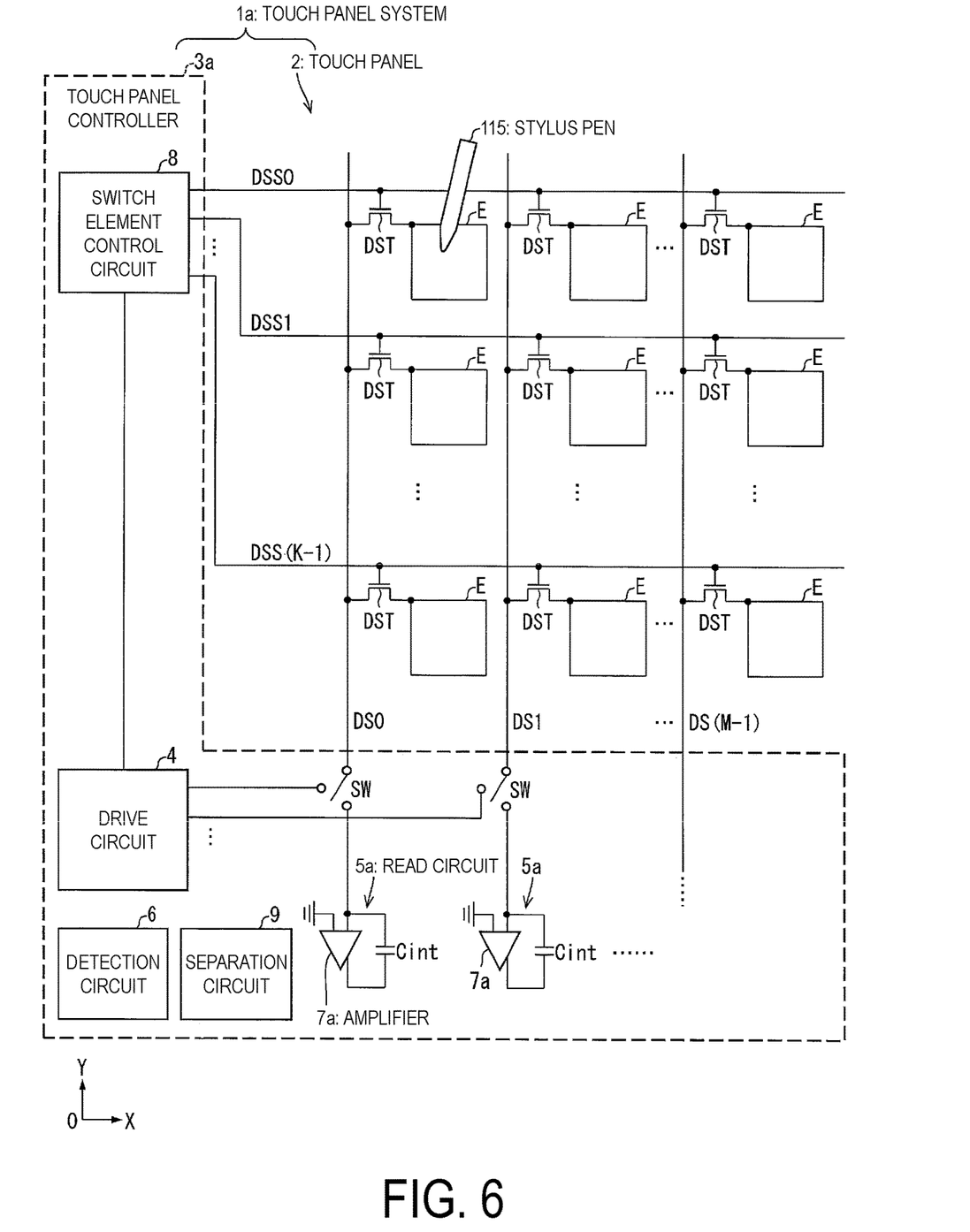
FIG. 6 is a circuit diagram illustrating a configuration of a touch panel system according to a second embodiment.

A description follows regarding another embodiment of the present invention, with reference to FIG. 6. Note that members having the same function as the members stated in the embodiment above are appended with the same reference signs for the sake of description, and the description thereof is omitted.

Configuration, Action, and Effect of Touch Panel System 1a

FIG. 6 is a circuit diagram illustrating a configuration of a touch panel system 1a according to a second embodiment. The touch panel system 1a performs single reading on a drive sense line.

The touch panel system 1a includes a touch panel 2, a touch panel controller 3a that controls the touch panel 2, and a stylus pen 115.

The touch panel controller 3a includes a drive circuit 4 connected to the M drive sense lines DS0 to DS(M−1) via switching switches SW, a switch element control circuit 8 connected to the K control lines DSS0 to DSS(K−1), M read circuits 5 connected to the drive sense lines, a detection circuit 6 that detects a capacitance or a change in capacitance between each of the detection electrodes E and the detected subject on the basis of an output of each of the read circuits 5a, and a separation circuit 9 that separates a DC component and an AC component from an output voltage waveform of the read circuit 5a.

Each of M drive sense lines DS0 to DS(M−1) is connected to one of inputs of an amplifier 7a of the corresponding read circuit 5a. Another input of the amplifier 7a is AC grounded. An integral capacitance Cint is connected between the one input and an output of the amplifier 7a. Note that each of the read circuits 5a may include a switch that short-circuits one terminal and the other terminal of the integral capacitance Cint and resets a state of the amplifier 7a (not illustrated).

The single reading reads an absolute value of a capacitance instead of a difference component of a capacitance. Thus, the single reading is advantageous in that a value of a linear sum signal is greater than that in the differential reading, but the amplifier is more likely to be saturated.

The touch panel system 1a having the configuration above works similarly to the touch panel system 1 illustrated in FIG. 1A.

Third Embodiment

Configuration and Main Action of Touch Panel System 1b

Figure 7:
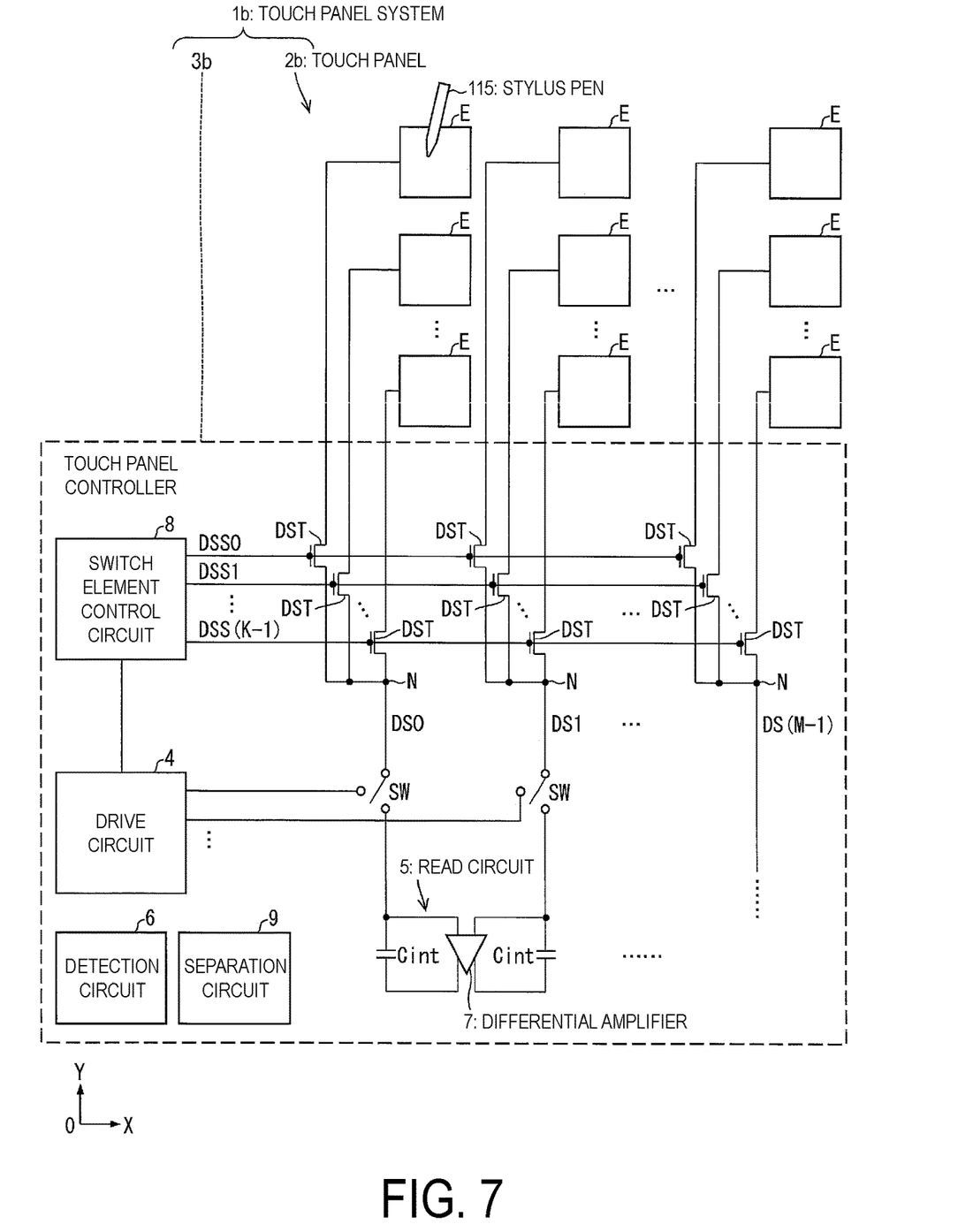
FIG. 7 is a circuit diagram illustrating a configuration of a touch panel system according to a third embodiment.

FIG. 7 is a circuit diagram illustrating a configuration of a touch panel system 1b according to a third embodiment of the present invention. Members having the same function as the members stated in the embodiment above are appended with the same reference signs, and the description thereof is omitted. The touch panel system 1b includes a touch panel 2b, a touch panel controller 3b that controls the touch panel 2b, and a stylus pen 115.

The touch panel 2b includes (K×M) detection electrodes E (electrodes) arranged in matrix. Herein, an X-axis direction is a first direction of this matrix. A Y-axis direction is a second direction intersecting the first direction of this matrix.

The touch panel controller 3b includes a drive circuit 4 connected to M drive sense lines DS0 to DS(M−1) via switching switches SW, a switch element control circuit 8 connected to K control lines DSS0 to DSS(K−1), a plurality of read circuits 5 connected to the drive sense lines adjacent to each other, a detection circuit 6 that detects a capacitance or a change in capacitance between each of the detection electrodes E and a detected subject on the basis of an output of each of the read circuits 5, a separation circuit 9 that separates a DC component and an AC component from an output voltage waveform of the read circuit 5, and a drive sense switch element DST (switch element).

Each of the read circuits 5 includes a differential amplifier 7 that amplifies a difference between outputs of the drive sense lines adjacent to each other and a pair of integral capacitances Cint provided between one input and one output of the differential amplifier 7 and between another input and another output thereof. Note that each of the read circuits 5 may include a switch that short-circuits one terminal and the other terminal of the integral capacitances Cint and resets a state of the differential amplifier 7 (not illustrated).

The drive sense lines DS0 to DS(M−1) are aligned in the X-axis direction. The plurality of detection electrodes E aligned in one line in the Y direction are connected to a node N via the drive sense switch elements DST and connected to one corresponding drive sense line via the node N.

The control lines DSS0 to DSS(K−1) are aligned in the Y direction. Gates of the plurality of drive sense switch elements DST connected to the plurality of detection electrodes E aligned in one line in the X direction are connected to one corresponding control line.

The touch panel 2b differs from the touch panel 2 in that the touch panel 2b does not include the drive sense switch element DST built therein. The touch panel controller 3b differs from the touch panel controllers 3, 3a in that the touch panel controller 3b includes the drive sense switch element DST built therein.

The touch panel system 1b having the configuration above works similarly to the touch panel system 1 illustrated in FIG. 1A.

Reference Action of Touch Panel System 1b

The touch panel system 1b formed as described above may work as follows.

First, the switch element control circuit 8 turns on the drive sense switch element DST selected among the (K×M) drive sense switch elements DST on the basis of a factor "1" of a code sequence of K rows and N columns via the K control lines DSS0 to DSS(K−1). At this time, the drive sense switch elements DST that are not selected are off. The switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with +V (for example, power source voltage) through the selected drive sense switch element DST.

Next, the switch element control circuit 8 turns off the (K×M) drive sense switch elements DST via the K control lines DSS0 to DSS(K−1) and brings each of the detection electrodes E into a floating state. The switching switches SW also switch in such a way to connect the read circuits 5 and the M drive sense lines DS0 to DS(M−1). Subsequently, the switch element control circuit 8 turns on the drive sense switch element DST on the basis of the factor "1" of the code sequence of K rows and N columns via the K control lines DSS0 to DSS(K−1). At this time, the drive sense switch elements DST that are not selected are off.

Each of the read circuits 5 amplifies a difference between linear sum signals based on an electric charge of each of the detection electrodes E read along the adjacent drive sense line via the drive sense switch element DST turning on. Next, the detection circuit 6 detects a capacitance or a change in capacitance between each of the detection electrodes E of the touch panel 2 and a detected subject on the basis of a sum-of-product calculation of the difference between the linear sum signals output from each of the read circuits 5 and the code sequence. Subsequently, the detection circuit 6 detects a position of the detected subject on the touch panel 2 on the basis of the detected capacitance or the detected change in capacitance.

The touch panel controller 3b can detect capacitance distribution between each of the detection electrodes E and the detected subject on the touch panel 2b with a simple configuration even in the passive touch panel 2b that does not include the drive sense switch element DST built therein. Furthermore, the touch panel controller 3b is more advantageous than the touch panel controller in the touch panel system in the related art illustrated in FIG. 9 in that the touch panel controller 3b can read a linear sum signal based on an electric charge of each of the detection electrodes E in parallel along a signal Effect of Touch Panel System 1b As described above, when the stylus pen 115 is used, the touch panel controller 3b can detect capacitance distribution between each of the detection electrodes E and the stylus pen 115 on the touch panel 2b with a simple configuration even in the passive touch panel 2b that does not include the drive sense switch element DST built therein.

Fourth Embodiment

Figure 8:
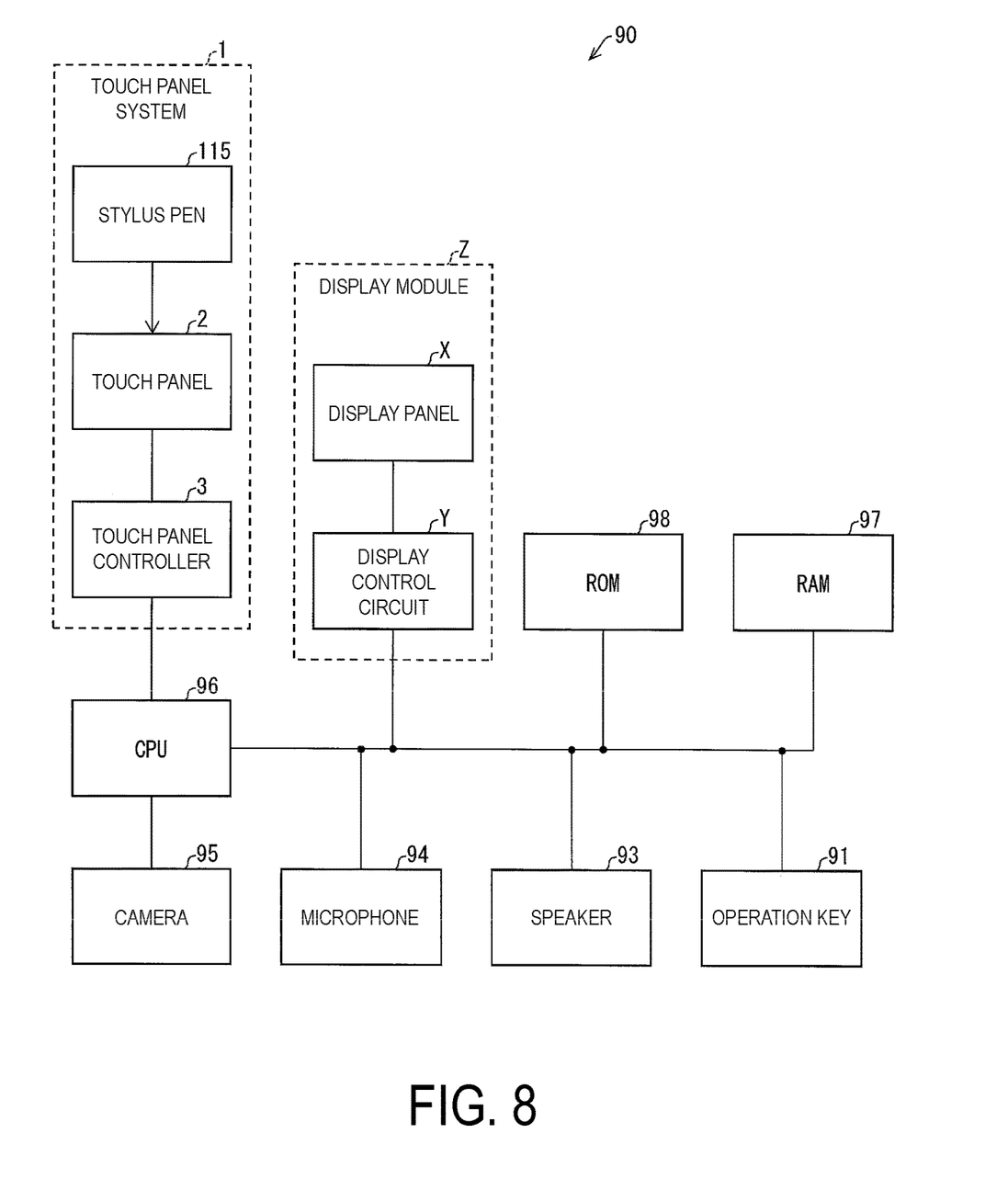
FIG. 8 is a block diagram illustrating a configuration of an electronic device according to a fourth embodiment.

FIG. 8 is a block diagram illustrating a configuration of a portable telephone 90 (electronic device) according to a fourth embodiment of the present invention. Members having the same function as the members stated in the embodiment above are appended with the same reference signs for the sake of description, and the description thereof is omitted.

The portable telephone 90 includes a CPU 96, a RAM 97, a ROM 98, a camera 95, a microphone 94, a speaker 93, an operation key 91, a display module Z including a display panel X and a display control circuit Y, and a touch panel system 1. Each of the components is connected to one another with a data bus.

The CPU 96 controls action of the portable telephone 90. The CPU 96 executes a program stored in the ROM 98, for example. The operation key 91 receives an input of an instruction by a user of the portable telephone 90. The RAM 97 stores data generated by execution of a program by the CPU 96 or data input via the operation key 91 in a volatile manner. The ROM 98 stores data in a non-volatile manner.

The ROM 98 is a ROM that enables writing and erasing, such as an erasable programmable read-only memory (EPROM) and a flash memory. Note that the portable telephone 90 may include an interface (IF) for connection to another electronic device with a wire, which is not illustrated in FIG. 8.

The camera 95 captures an object in response to an operation of the operation key 91 by a user. Note that image data of the captured object is stored in the RAM 97 and an external memory (for example, a memory card). The microphone 94 receives an input of a voice of a user. The portable telephone 90 digitizes the input voice (analog data). The portable telephone 90 then transmits the digitized voice to the other end of communication (for example, another portable telephone). The speaker 93 outputs a sound based on music data stored in the RAM 97, for example.

The touch panel system 1 includes a touch panel 2, a touch panel controller 3, and a stylus pen 115. The CPU 96 controls action of the touch panel system 1. The CPU 96 executes a program stored in the ROM 98, for example. The RAM 97 stores data generated by execution of a program by the CPU 96 in a volatile manner. The ROM 98 stores data in a non-volatile manner.

The display panel X displays an image stored in the ROM 98 and the RAM 97 by the display control circuit Y. The display panel X overlaps the touch panel 2 or includes the touch panel 2 built therein. The touch panel system 1 may be the touch panel system 1a according to the second embodiment or the touch panel system 1b according to the third embodiment.

Supplement

A capacitance detection method according to aspect 1 of the present invention is a capacitance detection method for detecting a capacitance or a change in capacitance between each of a plurality of electrodes (detection electrodes E) arranged in matrix and a stylus pen 115 applying an AC voltage to the electrode. The capacitance detection method includes: a read step of turning on a switch element selected among a plurality of switch elements (drive sense switch elements DST) between the plurality of electrodes and a plurality of signal lines (drive sense lines DS0 to DS(M−1)) aligned in a first direction of the matrix based on a code sequence via a plurality of control lines (control lines DSS0 to DSS(K−1)) aligned in a second direction intersecting the first direction and reading a linear sum signal along each of the plurality of signal lines from each of the plurality of electrodes; and a detection step of detecting the capacitance or the change in capacitance by a sum-of-product calculation of the linear sum signal and a decoding code sequence corresponding to the code sequence.

According to the method described above, a switch element selected among the plurality of switch elements is made to turn on, and a linear sum signal is read along each of the plurality of signal lines from each of the plurality of electrodes. At this time, the plurality of signal lines extend in the second direction. As a result, capacitance distribution in the second direction between each of the plurality of detection electrodes and the stylus pen on the touch panel can be detected.

Then, the capacitance distribution in the first direction and the second direction between each of the plurality of detection electrodes and the stylus pen on the touch panel can be detected by repeatedly detecting the capacitance distribution from every signal line aligned in the first direction.

As described above, a position of the stylus pen can be detected even on the touch panel having a simple configuration that reads a signal only from one direction.

Furthermore, noise superimposed on the plurality of signal lines has a smaller adverse effect than a configuration in which a switch element is not selected among a plurality of switch elements on the basis of a code sequence (for example, a configuration in which a code sequence is a unit matrix) in detection of capacitance distribution.

Preferably, the capacitance detection method according to aspect 2 of the present invention in aspect 1 further includes a drive step of changing a potential of the electrode by applying a DC voltage to the electrode. In the read step, a voltage waveform of an AC component based on the AC voltage is preferably separated from a voltage waveform of a DC component based on the DC voltage in the electrode, and at least one of amplitude information about the AC component and the DC component is preferably used as the linear sum signal.

According to the method described above, capacitance distribution can be detected between each of the electrodes and the stylus pen on the touch panel even in the touch panel system for charging a capacitance between the electrode and the detected subject with the DC voltage.

In the capacitance detection method according to aspect 3 of the present invention in aspect 2, the drive step is preferably a step of turning on a switch element selected among the plurality of switch elements based on the code sequence via the control line and driving the plurality of signal lines.

According to the method described above, capacitance distribution can be detected between each of the electrodes and the stylus pen on the touch panel even in the touch panel system for charging a capacitance between the electrode and the detected subject with the DC voltage on the basis of the code sequence.

In the capacitance detection method according to aspect 4 of the present invention in any one of aspects 1 to 3, the plurality of electrodes and the plurality of switch elements are preferably formed in a touch panel 2.

According to the method described above, a transistor forming the switch element can be produced with the same mask as a mask for the liquid crystal panel, thereby making it easier for the touch panel and the liquid crystal panel to be formed integrally.

In the capacitance detection method according to aspect 5 of the present invention in any one of aspects 1 to 3, the plurality of electrodes are preferably formed in a touch panel 2, and the plurality of switch elements are preferably formed in a touch panel controller 3 configured to control the touch panel.

According to the method described above, the plurality of switch elements are formed in the touch panel controller, thereby simplifying the configuration of the touch panel.

In the capacitance detection method according to aspect 6 of the present invention in any one of aspects 1 to 5, a difference between a linear sum signal along one of the plurality of signal lines and another linear sum signal along another one of the plurality of signal lines is preferably read in the read step.

According to the method described above, by differential reading that reads a difference between the plurality of signal lines, noise on one of the plurality of signal lines and noise on another one of the plurality of signal lines can cancel each other by subtraction, so that noise superimposed on the plurality of signal lines has a smaller adverse effect in detection of capacitance distribution.

In the capacitance detection method according to aspect 7 of the present invention in any one of aspects 1 to 5, a difference between a linear sum signal based on a group including some of the plurality of signal lines and another linear sum signal based on another group including others of the plurality of signal lines is preferably read in the read step.

According to the method described above, the plurality of signal lines are brought together into a group and then read, so that a signal component read from the plurality of signal lines can be increased.

A position detection method according to aspect 8 of the present invention is a position detection method for detecting a capacitance or a change in capacitance between each of a plurality of electrodes (detection electrodes E) arranged in matrix and a stylus pen applying an AC voltage to the electrode and detecting a position of the stylus pen on a touch panel. The position detection method includes: the capacitance detection method according to any one of aspects 1 to 7; and a position detection step of detecting a position of the stylus pen on the touch panel based on the capacitance or the change in capacitance that has been detected in the detection step.

According to the method described above, a position of the stylus pen on the touch panel can be detected with a simple configuration. Furthermore, noise superimposed on the plurality of signal lines has a smaller adverse effect than the related art in position detection of the stylus pen.

A touch panel controller 3 according to aspect 9 of the present invention is a touch panel controller 3 configured to control a touch panel by detecting a capacitance or a change in capacitance between each of a plurality of electrodes (detection electrodes E) arranged in matrix and a stylus pen applying an AC voltage to the electrode. The touch panel controller 3 includes: a read circuit 5, 5a configured to turn on a switch element selected among a plurality of switch elements (drive sense switch elements DST) between the plurality of electrodes and a plurality of signal lines (drive sense lines DS0 to DS(M−1)) aligned in a first direction of the matrix based on a code sequence via a plurality of control lines (control lines DSS0 to DSS(K−1)) aligned in a second direction intersecting the first direction and read a linear sum signal along each of the plurality of signal lines from each of the plurality of electrodes; and a detection circuit 6 configured to detect the capacitance or the change in capacitance by a sum-of-product calculation of the linear sum signal and a decoding code sequence corresponding to the code sequence.

In the touch panel controller according to aspect 10 of the present invention in aspect 9, the touch panel is preferably provided on a display surface of a liquid crystal panel, and the plurality of electrodes are preferably used as common electrodes of the liquid crystal panel.

The configuration above simplifies a configuration of an in-cell liquid crystal panel in which a touch panel is installed.

An electronic device (portable telephone 90) according to aspect 11 of the present invention includes the touch panel controller according to aspect 9 or 10.

Supplementary Note

The present invention is not limited to each of the embodiments stated above, and various modifications may be implemented within a range not departing from the scope of the claims. Embodiments obtained by appropriately combining technical approaches stated in each of the different embodiments also fall within the scope of the technology of the present invention. Moreover, novel technical features may be formed by combining the technical approaches stated in each of the embodiments.

REFERENCE SIGNS LIST 1, 1a, 1b Touch panel system
2, 2b Touch panel
3, 3a, 3b Touch panel controller
4 Drive circuit
5, 5a Read circuit
6 Detection circuit
7 Differential amplifier
7a Amplifier
8 Switch element control circuit
9 Separation circuit
90 Portable telephone (electronic device)
115 Stylus pen
DS0 to DS(M−1) Drive sense line (signal line)
DSS0 to DSS(K−1) Control line (control line)
DST Drive sense switch element (switch element)
E Detection electrode (electrode)

The invention claimed is:

1. A capacitance detection method for detecting a capacitance or a change in capacitance between each of a plurality of electrodes arranged in a matrix and a stylus pen applying an AC voltage to the electrode, the capacitance detection method comprising:
    a read step of turning on a switch element selected among a plurality of switch elements between the plurality of electrodes and a plurality of signal lines aligned in a first direction of the matrix based on a code sequence via a plurality of control lines aligned in a second direction intersecting the first direction and reading a linear sum signal along each of the plurality of signal lines from each of the plurality of electrodes; and
    a detection step of detecting the capacitance or the change in capacitance by a sum-of-product calculation of the linear sum signal and a decoding code sequence corresponding to the code sequence.

2. The capacitance detection method according to claim 1 further comprising a drive step of changing a potential of the electrode by applying a DC voltage to the electrode,
    wherein in the read step, a voltage waveform of an AC component based on the AC voltage is separated from a voltage waveform of a DC component based on the DC voltage in the electrode, and at least one of amplitude information about the AC component and the DC component is used as the linear sum signal.

3. The capacitance detection method according to claim 2, wherein the drive step is a step of turning on the switch element selected among the plurality of switch elements based on the code sequence via the control line and driving the plurality of signal lines.

4. The capacitance detection method according to claim 1, wherein the plurality of electrodes and the plurality of switch elements are formed in a touch panel.

5. The capacitance detection method according to claim 1, wherein the plurality of electrodes are formed in a touch panel, and
    the plurality of switch elements are formed in a touch panel controller configured to control the touch panel.

6. The capacitance detection method according to claim 1, wherein a difference between a linear sum signal along one of the plurality of signal lines and another linear sum signal along another one of the plurality of signal lines is read in the read step.

7. The capacitance detection method according to claim 1, wherein a difference between a linear sum signal based on a group including some of the plurality of signal lines and another linear sum signal based on another group including others of the plurality of signal lines is read in the read step.

8. A position detection method for detecting a capacitance or a change in capacitance between each of a plurality of electrodes arranged in a matrix and a stylus pen applying an AC voltage to the electrode and detecting a position of the stylus pen on a touch panel, the position detection method comprising:
    the capacitance detection method according to claim 1; and
    a position detection step of detecting a position of the stylus pen on the touch panel based on the capacitance or the change in capacitance that has been detected in the detection step.

9. A touch panel controller configured to control a touch panel by detecting a capacitance or a change in capacitance between each of a plurality of electrodes arranged in a matrix and a stylus pen applying an AC voltage to the electrode, the touch panel controller comprising:
    a read circuit configured to turn on a switch element selected among a plurality of switch elements between the plurality of electrodes and a plurality of signal lines aligned in a first direction of the matrix based on a code sequence via a plurality of control lines aligned in a second direction intersecting the first direction and read a linear sum signal along each of the plurality of signal lines from each of the plurality of electrodes; and
    a detection circuit configured to detect the capacitance or the change in capacitance by a sum-of-product calculation of the linear sum signal and a decoding code sequence corresponding to the code sequence.

10. The touch panel controller according to claim 9, wherein the touch panel is provided on a display surface of a liquid crystal panel, and
    the plurality of electrodes are used as common electrodes of the liquid crystal panel.

11. An electronic device comprising the touch panel controller according to claim 9.

* * * * *